US009155085B2

(12) United States Patent
Ratasuk et al.

(10) Patent No.: US 9,155,085 B2
(45) Date of Patent: *Oct. 6, 2015

(54) METHOD FOR UPLINK ACKNOWLEDGEMENT/NON-ACKNOWLEDGEMENT MESSAGES IN A WIRELESS COMMUNICATION SYSTEM

(71) Applicant: Google Technology Holdings LLC, Mountain View, CA (US)

(72) Inventors: Rapeepat Ratasuk, Hoffman Estates, IL (US); Amitabha Ghosh, Buffalo Grove, IL (US); Weimin Xiao, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,501

(22) Filed: Jun. 17, 2014

(65) Prior Publication Data

US 2014/0293938 A1 Oct. 2, 2014

Related U.S. Application Data

(63) Continuation of application No. 12/366,527, filed on Feb. 5, 2009, now Pat. No. 8,767,632.

(51) Int. Cl.
*H04W 72/04* (2009.01)
*H04L 1/16* (2006.01)
*H04L 1/18* (2006.01)

(52) U.S. Cl.
CPC ............ *H04W 72/0413* (2013.01); *H04L 1/16* (2013.01); *H04L 1/1614* (2013.01); *H04L 1/1854* (2013.01); *H04L 1/1887* (2013.01)

(58) Field of Classification Search
CPC ....... H04L 1/16; H04L 1/1614; H04L 1/1854; H04L 1/1887; H04W 72/0413
USPC .......................................... 370/310, 328, 329
See application file for complete search history.

(56) References Cited

U.S. PATENT DOCUMENTS 7,408,913 B2 * 8/2008 Khan .......................... 370/345
7,774,686 B2 * 8/2010 Ahn et al. .................... 714/776
(Continued)

OTHER PUBLICATIONS

3GPP TSG RAN WG1 #51 bis, R1-080316 "Multi-Ack Transmission in PUCCH for TDD" Nokia & Nokia Siemens Networks; Seville, Spain; Jan. 14-18, 2008, 3 pages.
(Continued)

*Primary Examiner* — Chi H Pham
*Assistant Examiner* — Robert Lopata
(74) *Attorney, Agent, or Firm* — Lerner, David, Littenberg, Krumholz & Mentlik, LLP

(57) ABSTRACT

A method for uplink ACK/NACK for LTE TDD. The method includes receiving a frame having multiple subframes wherein a plurality of subframes being downlink subframes and at least one subframe being an uplink subframe. One uplink subframe can contain an acknowledgment/non-acknowledgment (ACK/NACK) corresponding to at least one of the plurality of downlink subframes. To transmit ACK/NACKs, one uplink subframe for ACK/NACK is used in response to one of the plurality of downlink subframes. In addition, ACK/NACK responses can be bundled into one uplink subframe for at least two of the plurality of downlink subframes. In an embodiment, multiple ACK/NACK responses can be used in one uplink subframe that corresponds to at least two of the plurality of downlink subframes in a multiple feedback configuration. One uplink subframe for ACK/NACK responses and bundling multiple ACK/NACK responses is for a bundled feedback configuration.

20 Claims, 6 Drawing Sheets

(56) References Cited

U.S. PATENT DOCUMENTS

| | | | |
|---|---|---|---|
| 7,912,007 B2* | 3/2011 | Fan et al. | 370/329 |
| 7,957,317 B2* | 6/2011 | Frederiksen et al. | 370/252 |
| 7,957,329 B2* | 6/2011 | Ahn et al. | 370/280 |
| 8,072,911 B2* | 12/2011 | Astely et al. | 370/280 |
| 8,165,035 B2* | 4/2012 | Che et al. | 370/252 |
| 8,184,579 B2* | 5/2012 | Shen et al. | 370/329 |
| 8,281,204 B2* | 10/2012 | Hu et al. | 714/749 |
| 8,295,155 B2* | 10/2012 | Cho et al. | 370/209 |
| 8,331,947 B2* | 12/2012 | Kim et al. | 455/450 |
| 8,345,605 B2* | 1/2013 | Shen et al. | 370/329 |
| 8,396,030 B2* | 3/2013 | Frederiksen et al. | 370/329 |
| 2007/0223404 A1* | 9/2007 | Khan et al. | 370/278 |
| 2008/0080422 A1* | 4/2008 | Frederiksen et al. | 370/329 |
| 2009/0046649 A1* | 2/2009 | Gao et al. | 370/329 |
| 2009/0181689 A1* | 7/2009 | Lee et al. | 455/450 |
| 2009/0196204 A1* | 8/2009 | Astely et al. | 370/280 |
| 2010/0150081 A1* | 6/2010 | Gao et al. | 370/329 |
| 2010/0165939 A1* | 7/2010 | Lin | 370/329 |
| 2010/0210256 A1* | 8/2010 | Shen et al. | 455/422.1 |
| 2011/0110262 A1 | 5/2011 | Yu et al. | |
| 2011/0188381 A1* | 8/2011 | Kim et al. | 370/242 |
| 2011/0268053 A1* | 11/2011 | Che et al. | 370/329 |
| 2012/0093097 A1* | 4/2012 | Che et al. | 370/329 |

OTHER PUBLICATIONS

3GPP TSG RAN WG1 #51 bis, R1-080344 "Multiple ACKINACK Transmissions on PUCCH for TDD" Ericsson; Sevilla, Spain; Jan. 14-18, 2008, 5 pages.

3GPP TSG RAN WG1 #51bis, R1-080084 "Repetition of UL ACKINACK on PUCCH" Motorola; Sevilla, Spain; Jan. 14-18, 2008, 4 pages.

3GPP TSG RAN WG1 #51bis, R1-080482 "UL Control Details forTDD" Qualcomm Europe; Sevilla, Spain; Jan. 14-18, 2008, 6 pages.

3GPP TSG RAN WG1 #51bis, R1-080575 "Way Forward on PUCCH CQI Coding" LG Electronics, Texas Instruments; Sevilla, Spain; Jan. 14-18, 2008, 2 pages.

3GPP TSG RAN WG1 #52bis, R1-081292 "Uplink ACKINACK for TDD" Motorola; Shenzhen, China; Mar. 31-Apr. 4, 2008, 4 pages.

3GPP TSG RAN WG1 #53, R1-082064 "Multiple ACKINACK Transmission for TDD" Motorola; Kansas City, US; May 5-9, 2008, 9 pages.

3GPP TSG RAN WG1 #53, R1-082100 "ACK/NACK Bundling forTDD: Way Forward" Motorola et al.; Kansas City, US; May 5-9, 2008, 6 pages.

Alcatel-Lucent: "Implications of Solutions for Subframe Bundling", 3GPP Draft; R1-080914_Implicationssubframebundling, 3rd Generation Partnership Project(3GPP). Mobile Competence Centre; 650, Route Des Lucioles: F-06921 Sophia-Antipolis Cedex; France, vol. RAN WG1, No. Sorrento. Italy: 20080206, Feb. 6, 2008, all pages.

Motorola "UL ACK/NACK for TOO", 3GPP Draft; R1-080738, 3rd Generation Partnership Project (3GPP), Mobile Competencecentre; 650, Route Des Lucioles. F..06921 Sophia-Antipolis Cedex; France, vol. RAN WG1, No. Sorrento. Italy, 20080206, Feb. 6, 2008, all pages.

Nokia et al: "Downlink scheduling for ACK/NACK bundling", 3GPP Draft; R1-084152, 3rd Generation Partnership Roject (3GPP), Mobile Competence Centre: 650, Route Des Lucioles: F-06921 Sophia-Antipolis Cedex; France, vol. RAN WG1, No. Shenzhen, China, 20080326, Mar. 26, 2008, all pages.

Patent Cooperation Treaty, International Search Report and Written Opinion of the International Searching Authority for International Application No. PCT/US2010/023172, Feb. 4, 2010, 17 pages.

Texas Instruments et al: "Explicit DTX Signaling with ACT/NAK Bundling in TDD", 3GPP Draft; R1-081373, ACKNAKTD-DTOGBIT, 3rd Generation Partnership Project (3GPP), Mobile Competence Centre; 650, Route Des Lucioles; F-06921 Sophia-Antipois Cedex; France, vol. RAN WG1, No. Shenzhen, China: 20080327, Mar. 27, 2008, all pages.

* cited by examiner

METHOD FOR UPLINK ACKNOWLEDGEMENT/NON-ACKNOWLEDGEMENT MESSAGES IN A WIRELESS COMMUNICATION SYSTEM

CROSS-REFERENCE TO RELATED APPLICATIONS

The present application is a continuation of U.S. patent application Ser. No. 12/366,527, filed Feb. 5, 2009, and issued as U.S. Pat. No. 8,767,632 on Jul. 1, 2014, the disclosure of which is incorporated herein by reference.

FIELD OF THE INVENTION

The present invention relates generally to uplink acknowledgment/non-acknowledgment messages in a wireless communication system and, in particular, to sending uplink acknowledgment/non-acknowledgment messages in a subframe for one or multiple downlink subframes in a Long Term Evolution wireless communication system using time division duplex.

BACKGROUND

In a data frame have a plurality of subframes, it is known that the plurality of subframes can include multiple downlink subframes and multiple uplink subframes. In certain configurations there are fewer uplink subframes than are configured to include acknowledgment/non-acknowledgment messages (ACK/NACK) for the multiple downlink frames.

There is a coverage issue when multiple ACK/NACK bits are transmitted. User equipment in coverage-limited situations may schedule data reception using multiple subframes. Thus, ACK/NACK bundling has been proposed as a way to transmit a single acknowledgment. This can significantly increase the coverage of the physical uplink control channel (PUCCH), and user equipments that are in poor coverage may be configured to operate in this mode. In this mode, a missed scheduling assignment can be problematic if an ACK is transmitted. To minimize this error case, the eNode B can either limit the number of downlink subframes it can schedule to a user equipment with this feedback mode or it an adjust the physical downlink control channel (PDCCH) transmission power to minimize PDCCH error.

For user equipment that is in good coverage areas, there should be no issue in transmitted multiple acknowledgments in order to maximize system throughput. Nonetheless, it still needs to be determined whether user equipment will be configured to feedback a certain number of bits based on the configuration of downlink and uplink or with the user equipment have the flexibility to feedback based on actual number of downlink subframes received. There is the possibility of mismatch between what the user equipment is sending versus what the eNode B may be expecting due to missed scheduling assignments. Coverage can be affected as only one configuration will be supported in a cell.

In view of the foregoing, there is a need to determine how to transmit uplink ACK/NACK for Long Term Evolution wireless communication systems using time division duplex (TDD). In TDD one uplink subframe ACK/NACK from multiple downlink subframes should be transmitted. There are two known modes: single ACK/NACK, which can use ACK/NACK bundling, or multiple ACK/NACK. The question remains how to support both modes, how to transmit multiple ACK/NACK and how to implicitly ACK/NACK resource indication.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
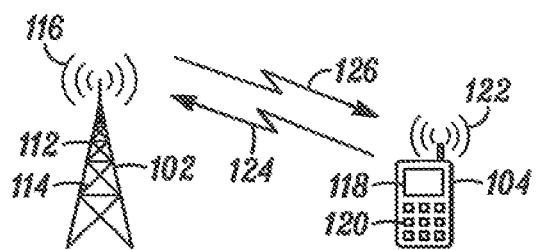
FIG. 1 is an example a wireless communication system that operates in accordance with some embodiments.
Figure 1:
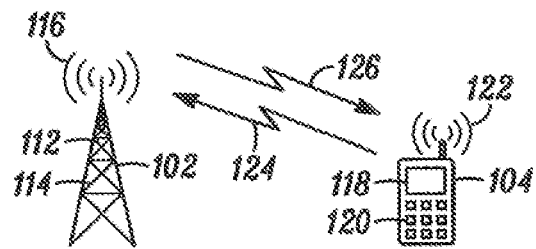

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method of uplink acknowledgment/non-acknowledgment (ACK/NACK) for Long Term Evolution (LTE) time division duplex (TDD) wireless communication networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method of uplink ACK/NACK for LTE TDD wireless communication networks described herein. The non-processor circuits may include, but are not limited to, a radio receiver, a radio transmitter, signal drivers, clock circuits, power source circuits, and user input devices. As such, these functions may be interpreted as steps of a method to perform the method of uplink ACK/NACK for LTE TDD wireless communication networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In an embodiment, there is a method for uplink ACK/NACK for LTE TDD. The method includes receiving a frame having multiple subframes wherein a plurality of subframes being downlink subframes and at least one subframe being an uplink subframe. One uplink subframe can contain an acknowledgment/non-acknowledgment (ACK/NACK) corresponding to at least one of the plurality of downlink subframes. To transmit ACK/NACKs, one uplink subframe for ACK/NACK is used in response to one of the plurality of downlink subframes. In addition, ACK/NACK responses can be bundled into one uplink subframe for at least two of the plurality of downlink subframes. In an embodiment, multiple ACK/NACK responses can be used in one uplink subframe that corresponds to at least two of the plurality of downlink subframes in a multiple feedback configuration. One uplink subframe for ACK/NACK responses and bundling multiple ACK/NACK responses is for a bundled feedback configuration.

In an embodiment, the method can also include selecting between a bundled feedback configuration and a multiple feedback, e.g. N-subframe, configuration. In this embodiment, the bundled feedback configuration includes one of a one-bit physical uplink control channel format (PUCCH) and a two-bit PUCCH format. Moreover, the multiple feedback configuration uses a channel quality indicator transmission configuration.

In bundled multiple ACK/NACK response in one uplink subframe used 1 bit for ACK/NACK responses for allocated downlink subframes. The uplink subframes receive dynamic and semi-persistent downlink scheduling assignments within a window of subframes and transmitting ACK/NACK on the physical uplink control channel (PUCCH) using dynamic downlink scheduling assignments. In this embodiment, the semi-persistent downlink scheduling assignments are ignored and an uplink ACK/NACK PUCCH index is assigned using a lowest control channel element index for the last received dynamic downlink scheduling assignment. The last received dynamic downlink scheduling assignment indicates that all dynamic downlink scheduling assignments have been received. In addition, the ACK/NACKs are transmitted on the PUCCH and include using different sequences in the uplink subframes corresponding to each of the different configurations of ACK/NACKs on the PUCCH.

The multiple ACK/NACK responses includes transmitting one of the number of bits in the multiple subframe and two times the number of bits in the multiple subframe. In addition, the multiple ACK/NACK responses includes transmitting the ACK/NACK responses using a channel quality indicator transmission configuration on the physical uplink control channel. The method can transmit one of the number of bits in the multiple subframe and two times the number of bits in the multiple subframe. The multiple ACK/NACK responses can also include determining an uplink ACK/NACK physical uplink control channel (PUCCH) index using one of a user equipment identification and a given parameter as a function of the index and the lowest control channel element for a last received dynamic downlink scheduling assignment.

Turning to FIG. 1, there is shown a wireless telecommunication system 100. System 100 includes a plurality of base stations or eNode Bs 102 that provides wireless communications to a plurality of user equipment 104 that operate within the cells defined by the eNode Bs 102. The wireless communications between the eNode B 102 and the user equipment 104 operates according to known and developing standards including UMTS, LTE and WiMAX 802.16 standard protocols. In addition, the wireless communications between the eNode B 102 and the user equipment 104 use time division duplex (TDD) technology.

As is understood, the eNode B 102 includes a processor 112, memory 114 and antenna 116. Likewise, the user equipment 104 also includes a processor 118, memory 120 and antenna 122. The eNode B 102 and user equipment 104 transmit and receive messages with one another using the processors 112 and 118, memories 114 and 120 antennae 116 and 122, respectively, according to standard protocol methods and according to the methods and procedures described here. Messages are transmitted from user equipment 104 to an eNode B 102 on an uplink channel 124 according to these methods. Messages are transmitted from the eNode B 102 to the user equipment 104 on a downlink channel 126 also according to these methods.

Figure 2:
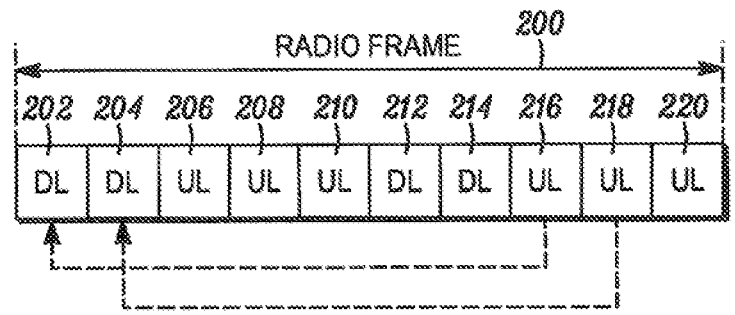
FIG. 2 is frame structure where the uplink subframes is equal to are greater than the downlink subframes.

In TDD, uplink subframes can correspond with downlink subframes such that for an allocation with more uplink subframes than downlink subframes not all uplink subframes will be provisioned with ACK/NACK resources. An example of this configuration is shown in FIG. 2 where frame 200 has subframes 202-220, which are designated as downlink subframes 202, 204, 212, 214 and uplink subframes 206, 208, 210, 216, 218 and 220.

Figure 3:
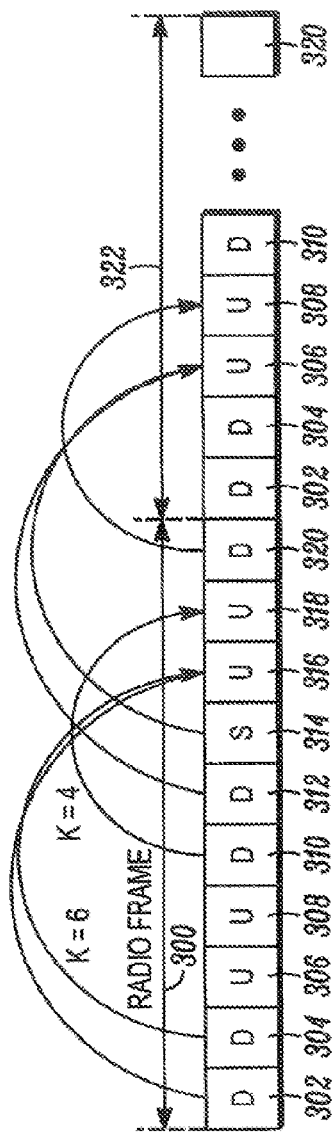
FIG. 3 is a frame structure where the downlink subframes are greater than the uplink subframes that operates in accordance with some embodiments of the invention.
Figure 4:
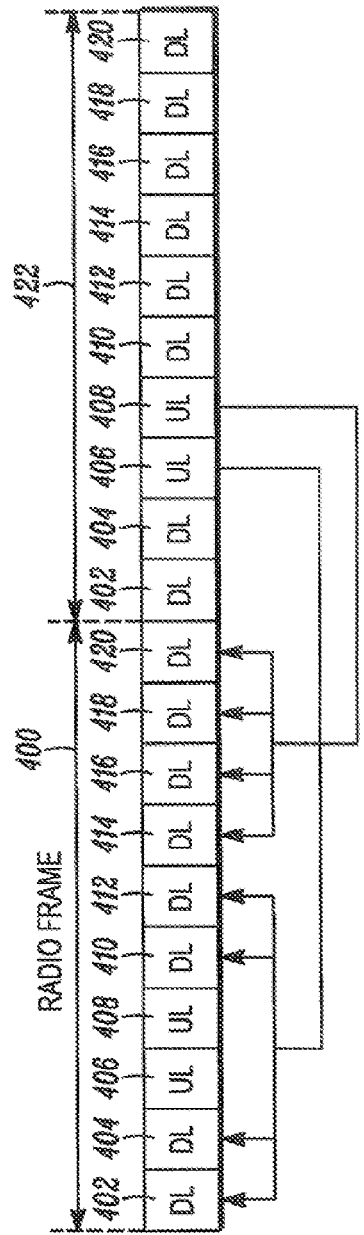
FIG. 4 is another frame structure where the downlink subframes are greater than uplink subframes that operates in accordance with some embodiments.

FIGS. 3 and 4 illustrate a downlink/uplink subframe allocation with more downlink subframes than uplink subframes. Thus, it is disclosed here to bundle ACK/NACK physical uplink control channels to a specific set of downlink subframes. FIG. 3 shows a 6DL/4UL allocation, and FIG. 4 shows a 7DL/2UL allocation. Other downlink/uplink allocations can be used as well as other frame sizes.

FIG. 3 illustrates a frame structure 300, 322 that is used to transmit messages on the uplink channels 124 and downlink channels 126. As seen the frames 300 include a plurality of subframes 302-320. In FIG. 3, 10 subframes are used in frame 300, 322, but it is understood that a frame can have any number of subframes. Each subframe 302-320 can be designated as an uplink subframes 306, 308, 316, 318 (illustrated by U) or as a downlink subframes 302, 304, 310, 312, 314 and 320 (illustrated by D or S). In FIG. 4, frames 400, 422 are provided where uplink subframe 406 and 408 are allocated to provide ACK/NACK for downlink subframes 402, 404, 410, 412, 414, 416, 418, 420 as described in more detail below The subframe allocations shown in FIGS. 3 and 4 can be used for both ACK/NACK bundling as well as multiple ACK/NACK modes of operation. In ACK/NACK bundling the ACK/NACK for each of the downlink subframes use a logical AND operation such that an ACK is sent if the uplink subframe provides an ACK for all allocated downlink subframes. A NACK is sent if the uplink subframe provides at least one NACK for all the allocated subframes. In multiple ACK/NACK different bit configurations are used in the uplink subframe to designate the ACK/NACKs of the allocated downlink subframes. Referring to FIG. 3, a bit configuration of 00 in subframe 316 designates ACK for both downlink subframes 302, 304, bit configuration 01 designates ACK for subframe 302 and NACK for subframe 304, bit configuration 10 designates NACK for subframe 302 and ACK for subframe 304, and bit configuration 11 designates NACK for both subframes 302, 304. Different bit configurations can be used for different uplink/downlink subframe allocations.

Figure 5:
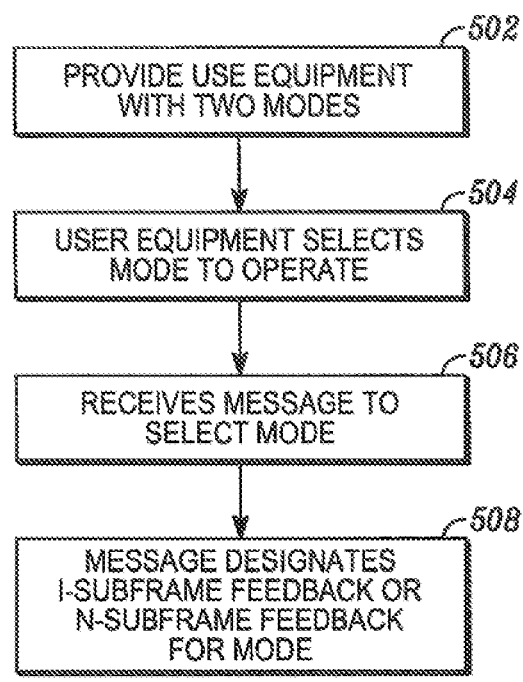
FIG. 5 is a flow chart illustrating a method for providing ACK/NACK responses in a frame where there are more downlink subframes than uplink subframes in accordance with some embodiments.

Turning to FIG. 5, a method 500 is shown for providing ACK/NACK responses in a frame where there a more downlink subframes than uplink subframes. The user equipment 103 is provided 502 with at least one of two modes. When two modes are provided, the user equipment selects 504 one of the two modes to operate. In an embodiment, the user equipment 104 receives 506 a message from the eNode B 102 during call set-up. The received message designates 508 to the user equipment 1-subframe feedback that uses ACK/NACK bundling or N-subframe feedback that uses multiple ACK/NACK. As can be understood, user equipment is assigned to either a bundled ACK/NACK feedback configuration and a multiple ACK/NACK feedback configuration and the user equipment is configured between the bundled ACK/NACK feedback configuration and a multiple ACK/NACK feedback configuration based on channel conditions.

As disclosed, in 1-subframe feedback, the eNode B 102 is restricted to schedule one downlink subframe to the user equipment 104 within an ACK/NACK response window, as shown in FIG. 2. Alternatively in 1-subframe feedback, the user equipment receives a bundled ACK/NACK in an uplink subframe when the eNode B 102 schedules multiple downlink subframes for the uplink. In an embodiment, the 1-subframe feedback configures the user equipment to use PUCCH format 0 or PUCCH format 1. In PUCCH format 0, one bit is used in the uplink control channel. In PUCCH format 1, two bits are used in the uplink control channel. In N-subframe feedback, the user equipment 104 is configured so that ACK/NACKs for up to N downlink subframe and will use multiple to designate the ACK/NACK responses. The user equipment configured in N-subframe format will use PUCCH 0, 1 or 2 format. PUCCH format corresponds to a channel quality (CQI) transmission configuration.

Returning to FIG. 3, there is shown an example of the configuration of how an uplink subframe can provide ACK/NACK bundling for plurality downlink subframes as well as can provide multiple ACK/NACK for the plurality of downlink subframes. Arrow 322 shows that uplink subframe 316 provides ACK/NACK for downlink subframes 302, 304. Arrow 324 shows that uplink subframe 318 provides ACK/NACK for downlink subframe 310. Arrow 326 indicates that uplink subframe 328 in the next frame 330 provides ACK/NACK messages for downlink subframes 312, 314, and arrow 332 provides ACK/NACK messages for downlink subframe 320. The configuration of which uplink subframes provide ACK/NACK messages for multiple downlink subframes can vary depending on the number and relationship of uplink and downlink subframes in a frame.

FIG. 4 is similar to FIG. 3. Arrow 424 from uplink subframe 406 in frame 422 provides ACK/NACK responses corresponding to downlink frames 402, 404, 410, 412 in frame 400. Arrow 426 from uplink subframe 408 in frame 422 provides ACK/NACK responses corresponding to downlink frames 414, 416, 418 and 420. As stated above, the allocation provided in FIG. 4 applies to both 1-subframe feedback or ACK/NACK bundling and N-subframe feedback or multiple ACK/NACK.

Figure 6:
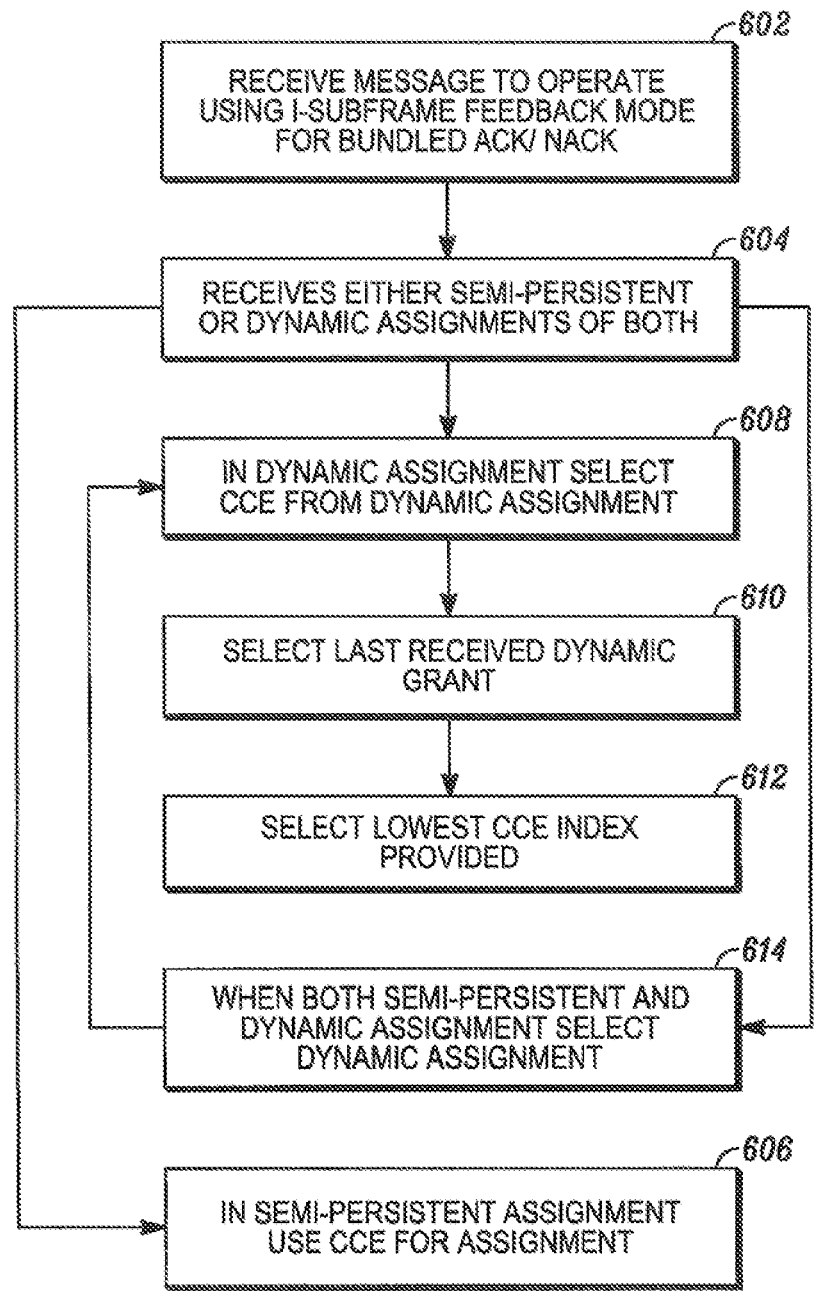
FIG. 6 is a flow chart illustrating the operation of 1-subframe feedback using bundled ACK/NACK responses in accordance with some embodiments.

FIG. 6 is a flow chart 600 illustrating the operation of a 1-subframe feedback using bundled ACK/NACK responses. To begin, the user equipment 104 receives 602 a designation from the eNode B 104 to operate using bundled ACK/NACK responses whereby an uplink subframe bundles the ACK/NACKs for multiple downlink subframes using PUCCH format 0 or PUCCH format 1. With the limited number of bits, the ACK/NACKs for the multiple downlink subframes use a logical AND operation and are conveyed in the allocated uplink subframe. In an embodiment, the user equipment 104 receives 604 either dynamic or semi-persistent downlink scheduling assignments within the downlink window. The user equipment can also receive both dynamic or semi-persistent downlink scheduling assignments in the downlink window. The downlink window is the downlink subframes that are allocated to the uplink subframe. For example, a downlink window includes subframes 302 and 304 corresponding to uplink subframe 316 or downlink window includes subframes 402, 404, 410, 412 corresponding to uplink subframe 406. In semi-persistent downlink scheduling assignments, the user equipment 104 receives a message indicating where in the subframe data is to be received and then in every subframe the data is in that area of the subframe. In dynamic downlink scheduling assignment, the user equipment 104 receives from the eNode B 102 scheduling grant before every subframe indicating where in the downlink the data is to be received.

In semi-persistent downlink scheduling assignments, the user equipment 104 receives a message uses 606 the control channel element (CCE) from the assignment. The CCE is the aggregation of the subcarriers or subframes in the frame and designates the allocation of downlink subframes to uplink subframes. In dynamic downlink scheduling assignments, each dynamic grant is made up of multiple CCEs such that one of the CCEs needs to selected 608. The user equipment selects 610 the last received dynamic grant from the multiple dynamic downlink scheduling assignments received in the frame. The user equipment uses the last received dynamic grant to indicate to the eNode B 102 that it has received all the dynamic grants. From the last received dynamic grant, the user equipment selects 612 the lowest CCE index provided.

When dynamic and semi-persistent downlink scheduling assignments are used in the same window, dynamic downlink scheduling assignments are selected 614. Thus, semi-persistent downlink scheduling assignments are ignored. The lowest CCE index is selected from the dynamic grants as described above. The user equipment 104 then determines the uplink ACK/NACK index for the PUCCH based on the selected lowest CCE and the downlink subframe number of the last received dynamic grant.

Figure 7:
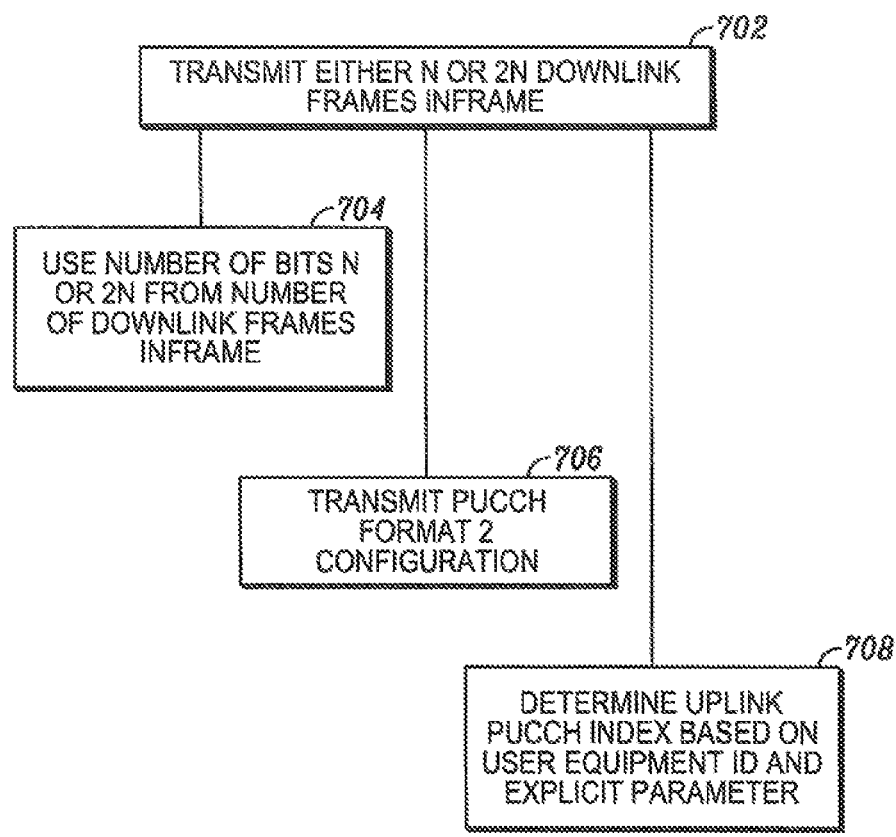
FIG. 7 is a flow chart illustrating the operation of N-subframe feedback using multiple ACK/NACK responses in accordance with some embodiments.

FIG. 7 is a flow chart 700 illustrating the operation of N-subframe feedback or multiple ACK/NACK responses. The user equipment 104 transmits 702 either N or 2N in the downlink subframe where N is the number of downlink subframes associated with the uplink subframe regardless of the number of actual scheduled subframes. The user equipment use 2N bits in MIMO operations. Otherwise, the user equipment uses N bits in the subframe. In response to receiving a N or 2N bits, the eNode B 102 uses 704 that number of bits to provide ACK/NACK responses to the user equipment 104 in the designated uplink subframe allocation. The designated uplink subframe can be determined during call set up or as described above for bundled ACK/NACK responses. The N or 2N bits are configured in different sequences to designate the different ACK/NACK allocation for the plurality of downlink subframes for which the uplink subframe provides a response. The eNode B 102 can also transmit 706 PUCCH format 2, which uses CQI formatting to designate the ACK/NACK responses. The different bit sequences in the PUCCH format 2 can be used to designate the different ACK/NACK allocation for the plurality of downlink subframes for which the uplinks subframe provides a response. Alternatively, the user equipment 104 determines 708 the uplink ACK/NACK PUCCH indices based on the user equipment ID and explicit parameters given on the downlink assignment or by determining the lowest CCE for the downlink subframes.

Figure 8:
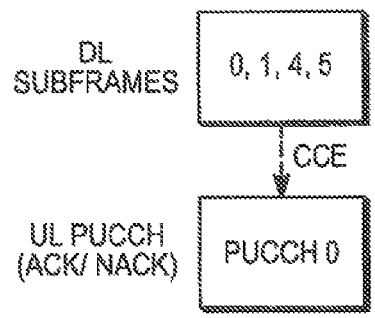
FIG. 8 is a block diagram illustrating ACK/NACK resource indication tied to the lowest CCE index in accordance with some embodiments.

As stated, ACK/NACK resource indication can be tied to the lowest CCE index used to form the downlink scheduling assignment. For TDD, the user equipment 104 may receive several assignments in different downlink subframes, within the same ACK/NACK response window. Thus, ACK/NACK resource indication is mapped to the lowest CCE index of the first scheduling assignment. This will prevent the eNode B from using the CCE as a starting CCE of a physical downlink control channel (PDCCH) in subsequent downlink subframes within the scheduling window. Although this could lead to scheduling difficulty due to CCE blocking, this will require the least amount of ACK/NACK resource to be provision. An example of this can be seen in FIG. 8.

Figure 9:
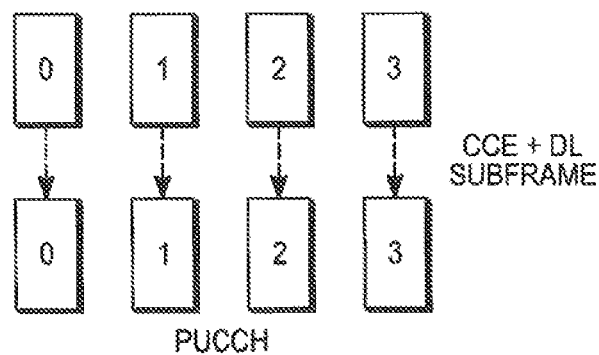
FIG. 9 is a block diagram illustrating ACK/NACK resource indication tied to the lowest CCE index and downlink subframe of the first scheduling assignment.

ACK/NACK resource indication can also be tied to the lowest CCE index and DL subframe of the first scheduling assignment. This is illustrated in FIG. 9. In this case. There is no problem with CCE blocking but large amount of ACK/NACK PUCCH resources must be provisioned. This can lead to high overhead, especially for allocation with large DL or UL imbalance.

Figure 10:
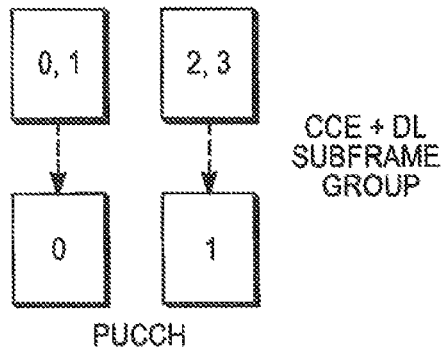
FIG. 10 is a block diagram illustrating ACK/NACK resource indication tied to lowest CCE index and the downlink of the subframe group of the first scheduled assignment.

Moreover, ACK/NACK resource indication can be tied to the lowest CCE index and the downlink subframe group of the first scheduled assignment. This is shown in FIG. 10. This method is a hybrid of the other described methods where the possible downlink subframes are divided into groups and each group is mapped to a unique ACK/NACK PUCCH region. This effectively reduces the number of ACK/NACK recourses while at the same time alleviating the issue of CCE blocking. The option illustrated in FIG. 10 does not prevent the eNode B 102 from implanting the other options of FIGS. 8 and 9 by defining the group size appropriately. It is also desirable to restrict the number of acknowledgments that can be carried in one feedback. As a result multiple ACK/NACK PUCCH regions should be defined with each associated with a group of downlink subframes. This implies scheduling restrictions where a user equipment can only be scheduled within one group of downlink subframes.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
   receiving in an uplink subframe an acknowledgment/non-acknowledgment response (ACK/NACK), wherein the response corresponds to multiple ACK/NACK for at least two of a plurality of downlink subframes;
   determining one of an uplink ACK/NACK physical uplink control channel (PUCCH) index using one of a user equipment identification and a parameter given in a dynamic downlink scheduling assignment; and
   determining an uplink ACK/NACK physical uplink control channel (PUCCH) index using a lowest control channel number and a parameter given in a last received dynamic downlink scheduling assignment.

2. The method of claim 1 further comprising selecting between a bundled ACK/NACK feedback configuration on the PUCCH and a multiple ACK/NACK feedback configuration on the PUCCH.

3. The method of claim 2 wherein the bundled ACK/NACK feedback configuration includes one of a one-bit physical control channel format (PUCCH) and a two-bit PUCCH format.

4. The method of claim 2 wherein the multiple ACK/NACK feedback configuration uses a channel quality indicator transmission configuration.

5. The method of claim 1 further comprising assigning user equipment to one of a bundled ACK/NACK feedback configuration and a multiple ACK/NACK feedback configuration.

6. The method of claim 5 further comprising configuring user equipment between the selected bundled ACK/NACK feedback configuration and the multiple ACK/NACK feedback configuration based on channel conditions.

7. The method of claim 1 further comprising transmitting N bits where N is the number of downlink subframes associated with an uplink subframe.

8. The method of claim 1 further comprising transmitting two times N bits where N is the number of downlink subframes associated with an uplink subframe.

9. The method of claim 1 further comprising transmitting a channel quality indicator format on the physical uplink control channel.

10. A system, comprising:
    a memory storing one or more instructions;
    an antenna adapted to receive in an uplink subframe an acknowledgment/non-acknowledgment response (ACK/NACK), wherein the response corresponds to multiple ACK/NACK for at least two of a plurality of downlink subframes; and
    one or more processors in communication with the memory and the antenna, the one or more processors configured to:

determine one of an uplink ACK/NACK physical uplink control channel (PUCCH) index using one of a user equipment identification and a parameter given in a dynamic downlink scheduling assignment; and determine an uplink ACK/NACK physical uplink control channel (PUCCH) index using a lowest control channel number and a parameter given in a last received dynamic downlink scheduling assignment.

11. The system of claim 10, wherein the one or more computing devices are further configured to select between a bundled ACK/NACK feedback configuration on the PUCCH and a multiple ACK/NACK feedback configuration on the PUCCH.

12. The system of claim 11, wherein the bundled ACK/NACK feedback configuration includes one of a one-bit physical control channel format (PUCCH) and a two-bit PUCCH format.

13. The system of claim 11, wherein the multiple ACK/NACK feedback configuration uses a channel quality indicator transmission configuration.

14. The system of claim 10, further configured to assign user equipment to one of a bundled ACK/NACK feedback configuration and a multiple ACK/NACK feedback configuration.

15. The system of claim 14, wherein the one or more computing devices are further configured to configure user equipment between the selected bundled ACK/NACK feedback configuration and the multiple ACK/NACK feedback configuration based on channel conditions.

16. The system of claim 10, wherein the one or more computing devices are further configured to transmit N bits where N is the number of downlink subframes associated with an uplink subframe.

17. The system of claim 10, wherein the one or more computing devices are further configured to transmit two times N bits where N is the number of downlink subframes associated with an uplink subframe.

18. The system of claim 10, wherein the one or more computing devices are further configured to transmit a channel quality indicator format on the physical uplink control channel.

19. A non-transitory machine readable medium on which instructions are stored, the instructions, when executed by one or more computing devices, cause the one or more computing devices to perform a method, the method comprising:

receiving in an uplink subframe an acknowledgment/non-acknowledgment response (ACK/NACK), wherein the response corresponds to multiple ACK/NACK for at least two of a plurality of downlink subframes;

determining one of an uplink ACK/NACK physical uplink control channel (PUCCH) index using one of a user equipment identification and a parameter given in a dynamic downlink scheduling assignment; and determining an uplink ACK/NACK physical uplink control channel (PUCCH) index using a lowest control channel number and a parameter given in a last received dynamic downlink scheduling assignment.

20. The medium of claim 19, wherein the method further comprises selecting between a bundled ACK/NACK feedback configuration on the PUCCH and a multiple ACK/NACK feedback configuration on the PUCCH.

* * * * *